United States Patent Office 2,924,431
Patented Feb. 9, 1960

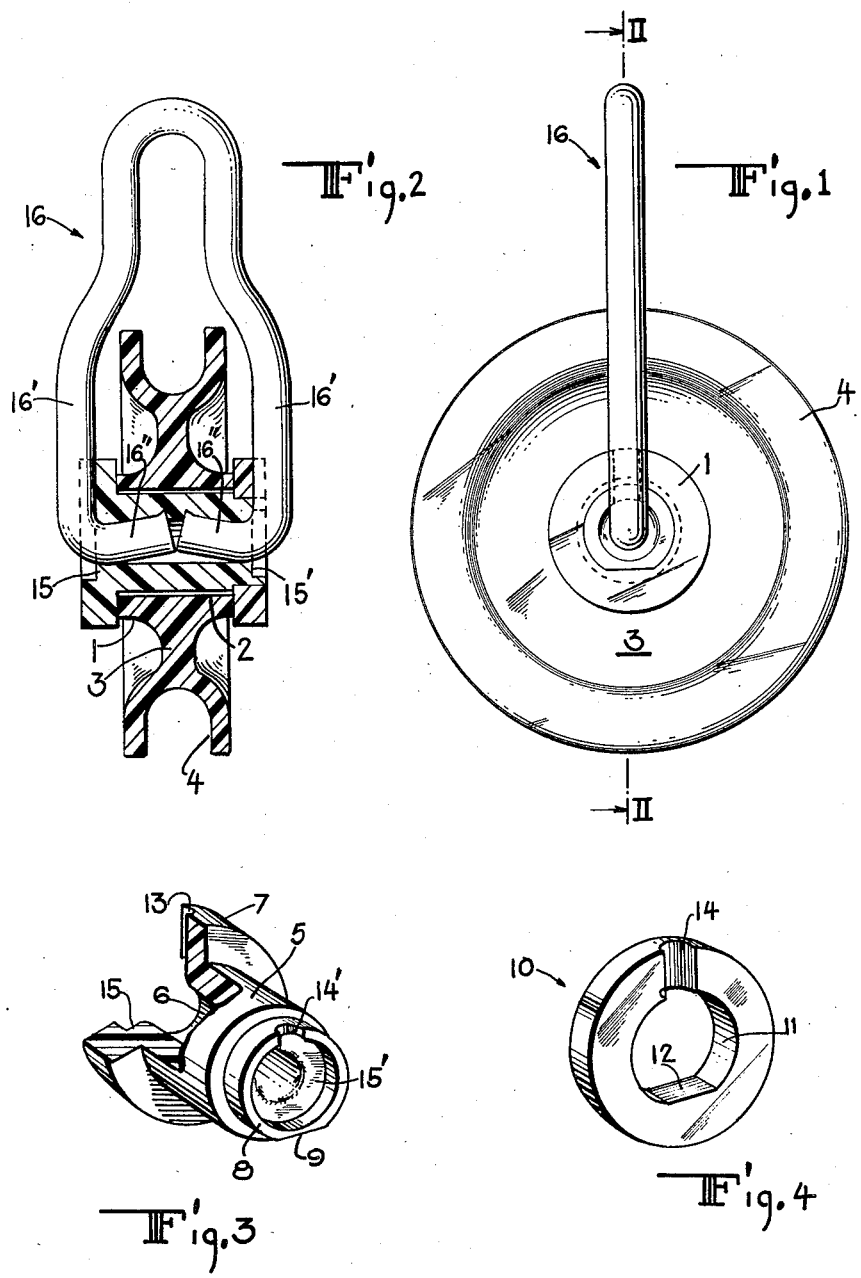

2,924,431
PULLEY
William H. Chadbourne, Hampton, Conn., assignor to The Danielson Manufacturing Company, Danielson, Conn., a corporation of Rhode Island Application April 21, 1958, Serial No. 729,765

4 Claims. (Cl. 254—192)

This invention relates to a pulley, and particularly to a pulley made entirely of nylon or the like and adapted to carry a cord or cable such as the steering cable of an outboard or inboard motor boat. This application is a continuation-in-part of applicant's copending application Serial No. 647,031, filed March 19, 1957 and now abandoned.

An object of the invention is to provide such a pulley which cannot rust or corrode, which will always turn freely without sticking, binding or seizing, which cannot be bent or broken under any possible conditions of operation, and which is also simple and economical to make, install and use.

A practical embodiment of the invention is shown in the accompanying drawing, wherein:

Fig. 1 represents a side elevation of the complete pulley assembled with its yoke or hanger;

Fig. 2 represents an axial section, through the complete pulley on the line II—II of Fig. 1;

Fig. 3 represents an enlarged detail perspective view of the pulley bearing, part being broken away, and Fig. 4 represents an enlarged detail perspective view of the washer element which fits on, and completes, the bearing.

Referring to the drawings, the main body of the pulley comprises the hub 1, having a cylindrical axial bore 2, the annular web 3 and the cable trough 4, the body just described being preferably molded as a single integral unit from a thermoplastic synthetic material of the nylon type; the nylon presently sold under the designation "FM–10001" has been found to be particularly suitable for this purpose.

The bearing comprises a cylindrical part 5, having an axial bore 6, an integral flange 7 and a generally cylindrical portion 8 of reduced diameter projecting from the part 5 on the end opposite the flange 7. The surface of the portion 8 is made non-cylindrical along a part of its extent, as by flattening it on one side as shown at 9. The bearing is completed by means of a washer 10 (Fig. 4) having the same outside dimensions as the flange 7, and being provided with a generally cylindrical bore 11 of a size and shape to fit closely on the portion 8; in the present case the bore has a flat side 12 corresponding to the flattened side 9 of the portion 8.

In a pulley having an outside diameter of somewhat less than two inches the running clearance between the bearing part 5 and the bore 2 of the pulley may suitably be in the range of about .005" to .010", in terms of comparative diameters. The bore 11 of the washer need have a clearance with respect to the surface 8 of only about .001", since the washer is preferably bonded to the bearing (as with phenol) when the parts are assembled in the relation shown in Fig. 2.

The flange 7 of the bearing has on its axially outward surface a radial groove 13 which may be of a depth equal to about half the thickness (in the axial direction) of the flange. At the opposite end the washer 10 is similarly grooved (as shown at 14) and the groove continues through the end of the portion 8 (as shown at 14'), the groove 14—14' being aligned with the groove 13 at the opposite end of the bearing.

The non-circularity of the portion 8 and bore 11 in the washer serves to ensure accurate registry of the groove 14 with the groove 14'. Within the flange 7 and within the washer 10 the axial bore of the bearing is preferably enlarged somewhat along the outwardly curving surfaces 15, 15' respectively.

The pulley described above is intended to be mounted in a yoke 16 which may be made of spring tempered stainless wire, the yoke being so shaped that its sides 16' will rest firmly in the grooves 13 and 14—14' with the ends of the yoke being close together adjacent the middle of the bore 6 in the bearing.

As an additional feature of considerable practical importance, the inwardly extending ends 16", 16" of the yoke are bent up to lie at angles of about 10° to the pulley axis, and at each inner end the top edge is preferably provided with a slight "burr." When the ends 16", 16" are separated for assembly with a pulley and its bearing, said ends will lie approximately in a straight line and can easily be started in the ends of the bore 6; as the yoke ends are forced toward their final position (Fig. 2) they deform the material of the bearing (without changing its exterior cylindrical shape) and the burrs particularly help to keep the yoke and bearing properly engaged. The upturned ends of the yoke act as a pair of hooks, giving the assembly greatly increased strength; for example, a given pulley in which the yoke ends are alined can carry a load of 250 to 290 lbs., while a pulley otherwise identical but having the yoke ends bent up as shown can carry loads up to 750 lbs.

The upper part of the yoke is narrowed so as to leave only a small clearance between the sides of the yoke and the peripheries of the cable trough, and extends far enough from the pulley in the radial direction to permit attachment to a hook, shackle, or other securing device. The pulley could, if desired, be mounted on a pin, screw or bolt, depending on its intended purpose and position of installation.

In an outboard motor-boat, two, four or more such pulleys may be used to guide a steering cable from the stern of the boat to one or more tiller or steering wheel locations. Since the nylon pulley runs only against nylon bearing surfaces (the cylindrical surface of part 5 and the flat inner walls of the flange 7 and washer 10) the friction is always low and no lubrication is necessary. Neither the stainless yoke nor the nylon pulley and bearing can be adversely affected by any conditions normally encountered in marine use of the type referred to. Pulleys of this sort, having an outside diameter of less than two inches, have withstood breaking test loads of 700 pounds or more (at which point it was the metal parts which showed strain) and a 100-pound weight has been lifted with a snap pull (putting more than 200 pounds load on the pulley) hundreds of times with no indications of failure.

Each of the three nylon parts can be molded easily and the assembling of them is very simple, so that the complete unit, including the metal yoke, can be marketed at prices far less than those now charged for inferior pulleys.

It will be understood that various modifications can be made in the form, construction and arrangement of the several parts without departing from the spirit and scope of the invention.

What I claim is:

1. A pulley assembly comprising a molded nylon pulley, a nylon bearing element therefor, and mounting means comprising a metallic yoke non-rotatably engaging said bearing element, each end of the bearing element being provided with a radial groove and the respective sides of the metallic yoke engaging said groove.

2. A pulley assembly according to claim 1 in which the bearing element is provided with an axial bore and in which the yoke comprises end portions extending inwardly and upwardly toward each other within said bore.

3. A pulley assembly according to claim 2 in which said end portions are embedded into the wall of said bore.

4. A pulley assembly according to claim 2 in which the said end portions are deformed adjacent their ends to form sharp upward projections and in which said projections are embedded into the wall of said bore.

References Cited in the file of this patent

UNITED STATES PATENTS

| | | |
|---|---|---|
| 1,674,071 | Smith | June 19, 1928 |
| 2,079,299 | McKissick | May 4, 1937 |
| 2,202,184 | Berger | May 28, 1940 |
| 2,359,026 | Flynn | Sept. 26, 1944 |
| 2,459,598 | Stott | Jan. 18, 1949 |
| 2,724,867 | Smith | Nov. 29, 1955 |

FOREIGN PATENTS

| | | |
|---|---|---|
| 464,410 | Canada | Apr. 18, 1950 |